United States Patent
Hawarden et al.

(10) Patent No.: US 6,231,474 B1
(45) Date of Patent: May 15, 2001

(54) AUTOMATED TRANSMISSION DOWNSHIFT CONTROL

(75) Inventors: Jeffrey Philip Hawarden, Rossendale; John Slater Tuson, Preston; David Edward Gibbons, Lancs; Robert Stanley Wheeler, Preston; Anthony Stasik, Coppull, all of (GB)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/471,872

(22) Filed: Dec. 23, 1999

(51) Int. Cl.$^7$ .................................................. B60K 41/20
(52) U.S. Cl. .............................. 477/94; 477/118; 477/203
(58) Field of Search .................................. 477/186, 187, 477/203, 122, 92, 94, 118; 701/55, 56

(56) References Cited

U.S. PATENT DOCUMENTS

| | | | | |
|---|---|---|---|---|
| 4,361,060 | | 11/1982 | Smyth | 74/866 |
| 4,551,802 | * | 11/1985 | Smyth | 701/55 |
| 4,576,065 | * | 3/1986 | Speranza et al. | 701/55 |
| 4,595,986 | | 6/1986 | Daubenspeck et al. | 364/424.1 |
| 4,648,290 | | 3/1987 | Dunkley et al. | 477/78 |
| 4,698,763 | * | 10/1987 | Smyth | 701/56 |
| 4,722,248 | | 2/1988 | Braun | 74/866 |
| 4,850,236 | | 7/1989 | Braun | 74/337 |
| 4,916,979 | * | 4/1990 | Irwin | 477/94 |
| 4,933,850 | * | 6/1990 | Wheeler | 701/56 |
| 5,053,963 | * | 10/1991 | Mack | 477/108 X |
| 5,219,391 | | 6/1993 | Edelen et al. | 74/335 |
| 5,305,240 | | 4/1994 | Davis et al. | 364/571 |
| 5,389,053 | | 2/1995 | Steeby et al. | 477/123 |
| 5,390,561 | | 2/1995 | Stine | 74/331 |
| 5,406,861 | | 4/1995 | Steeby | 74/336 |
| 5,409,432 | | 4/1995 | Steeby | 477/71 |
| 5,425,689 | | 6/1995 | Genise | 477/120 |
| 5,435,212 | | 7/1995 | Menig | 74/745 |
| 5,487,004 | | 1/1996 | Amsallen | 364/424.1 |
| 5,630,773 | | 5/1997 | Slicker et al. | 477/176 |
| 5,651,292 | | 7/1997 | Genise | 74/745 |
| 5,655,407 | | 8/1997 | Dresden et al. | 74/336 |
| 5,713,445 | | 2/1998 | Davis et al. | 192/35 |
| 5,737,978 | | 4/1998 | Stine | 74/606 |
| 5,743,143 | | 4/1998 | Carpenter et al. | 74/335 |
| 5,755,639 | | 5/1998 | Genise et al. | 477/111 |
| 6,123,644 | * | 9/2000 | Janecke et al. | 477/120 |

* cited by examiner

Primary Examiner—Charles A Marmor
Assistant Examiner—Ha Ho
(74) Attorney, Agent, or Firm—Howard D. Gordon

(57) ABSTRACT

A method/system for controlling downshifting in an automated mechanical transmission system (10) utilized on a vehicle having a manually controlled engine brake (46) and foot brake (44) system. The engine speed at which downshifts are commanded ($ES_{D/S}$) is modified as a function of sensed operation of the engine brake (EB?) and foot brake (FB) systems.

11 Claims, 4 Drawing Sheets

AUTOMATED TRANSMISSION DOWNSHIFT CONTROL

BACKGROUND OF THE INVENTION

1. Related Applications

This application is related to and claims priority from British Patent Applications No. 9828452.4, filed Dec. 24, 1998, and 9900777.5, filed Jan. 15, 1999, both assigned to EATON CORPORATION, the assignee of this application.

2. Field of the Invention

The present invention relates to a control method/system for controlling downshifting in an at least partially automated mechanical transmission system. In particular, the present invention relates to the control of downshifting in a vehicular automated mechanical transmission system wherein the system senses operation of an engine brake and the vehicle service brakes (also called foot brakes) and will modify downshift points as a function thereof.

2. Description of the Prior Art

Fully or partially automated mechanical transmission systems for vehicular use are known in the prior art, as may be seen by reference to U.S. Pat. Nos. 4,361,060; 4,648,290; 4,722,248; 4,850,236; 5,389,053; 5,487,004; 5,435,212 and 5,755,639. The use of engine brakes (also known as compression brakes, exhaust brakes or Jake brakes) and transmission controls utilizing same are known in the prior art, as may be seen by reference to U.S. Pat. Nos. 5,409,432 and 5,425,689.

SUMMARY OF THE INVENTION

An object of the present invention is to provide a control for a vehicular automated mechanical transmission system which will sense the operator's manual operation of the engine brake and/or foot brake systems and will modify the transmission shift points as a function thereof. In particular, the transmission downshift shift points will be modified in a manner which will provide the vehicle operator with the level of engine braking perceived to be requested by his/her operation of the engine brake and/or foot brake control.

This and other objects and advantages of the present invention will become apparent from a reading of the following description of the preferred embodiment taken in connection with the attached drawings.

DESCRIPTION OF THE PREFERRED EMBODIMENT

Figure 1:
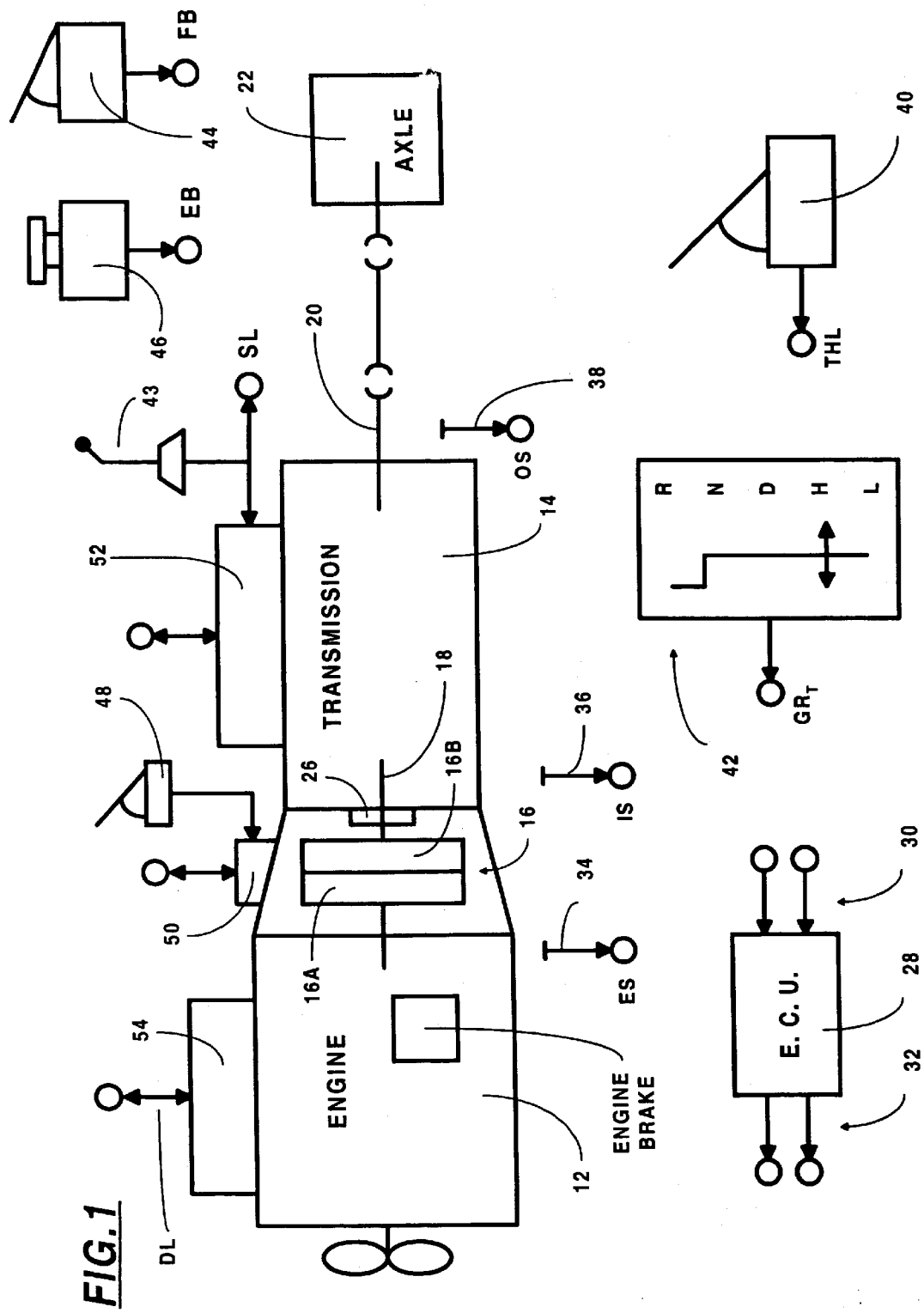
FIG. 1 is a schematic illustration, in block diagram formt, of an automated mechanical transmission system utilizing the control of the present invention.

An at least partially automated mechanical transmission system intended for vehicular use is schematically illustrated in FIG. 1. The automated transmission system 10 includes a fuel-controlled engine 12 (such as a well-known diesel engine or the like), a multiple-speed, change-gear transmission 14, and a non-positive coupling 16 (such as a friction master clutch) drivingly interposed between the engine and the input shaft 18 of the transmission. The transmission 14 may be of the compound type comprising a main transmission section connected in series with a splitter- and/or range-type auxiliary section. Transmissions of this type, especially as used with heavy-duty vehicles, typically have 9, 10, 12, 13, 16 or 18 forward speeds. Examples of such transmissions may be seen by reference to U.S. Pat. Nos. 5,390,561 and 5,737,978, the disclosures of which are incorporated herein by reference.

A transmission output shaft 20 extends outwardly from the transmission 14 and is drivingly connected with the vehicle drive axles 22, usually by means of a prop shaft 24. The illustrated master friction clutch 16 includes a driving portion 16A connected to the engine crankshaft/ flywheel and a driven portion 16B coupled to the transmission input shaft 18 and adapted to frictionally engage the driving portion 16A. An upshift brake 26 (also known as an input shaft brake or inertia brake) may be used for selectively decelerating the rotational speed of the input shaft 18 for more rapid upshifting, as is well known. Input shaft or upshift brakes are known in the prior art, as may be seen by reference to U.S. Pat. Nos. 5,655,407 and 5,713,445.

A microprocessor-based electronic control unit (or ECU) 28 is provided for receiving input signals 30 and for processing same in accordance with predetermined logic rules to issue command output signals 32 to various system actuators and the like. Microprocessor-based controllers of this type are well known, and an example thereof may be seen by reference to U.S. Pat. Nos. 4,595,986 and 4,648,290.

System 10 includes a rotational speed sensor 34 for sensing rotational speed of the engine and providing an output signal (ES) indicative thereof, a rotational speed sensor 36 for sensing the rotational speed of the input shaft 16 and providing an output signal (IS) indicative thereof, and a rotational speed sensor 38 for sensing the rotational speed of the output shaft 20 and providing an output signal (OS) indicative thereof. A sensor 40 may be provided for sensing the displacement of the throttle pedal and providing an output signal (THL) indicative thereof. A shift control console 42 may be provided for allowing the operator to select an operating mode of the transmission system and for providing an output signal (GRT) indicative thereof.

As is known, the rotational speed of the engine may be determined from the speed of the input shaft if the clutch is engaged and/or the speed of the output shaft and the engaged transmission ratio.

Alternatively, for systems wherein at least some of the shifting is controlled by a manual shift lever 43, a sensor may be provided for providing an input signal (SL) indicative of the position of the shift lever. Sensors of this basic type may be seen by reference to U.S. Pat. No. 5,743,143.

System 10 also includes sensors 44 and 46 for sensing operation of the vehicle foot brake (also called service brakes) and engine brakes, respectively, and for providing signals FB and EB, respectively, indicative thereof.

The master clutch 16 may be controlled by a clutch pedal 48 or by a clutch actuator 50 responding to output signals from the ECU 28. Alternatively, an actuator responsive to control output signals may be provided, which may be overridden by operation of the manual clutch pedal. Automated operation of a vehicular master clutch is known, as may be seen by reference to U.S. Pat. No. 4,081,065 and 5,630,773. The transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat. No. 5,305,240 and 5,219,391. Actuator 52 may shift the main and/or auxiliary section of transmission 14.

Fueling of the engine is preferably controlled by an electronic engine controller 54, which accepts command signals from and/or provides input signals to the ECU 28. Preferably, the engine controller 54 will communicate with an industry standard data link DL which conforms to well-known industry protocols such as SAE J1 922, SAE 1939 and/or ISO 11898. The ECU 28 may be incorporated within the engine controller 54.

The effectiveness of vehicle retardation provided by an engine or exhaust brake is determined in part by the speed of the engine and the engaged transmission ratio. Briefly, operation at the upper rotational speeds of the engine generally provides increased vehicle retardation, while changing gear ratio repeatedly will result in torque breaks in a mechanical transmission, which will significantly decrease the retardation effect of engine braking.

Figure 2:
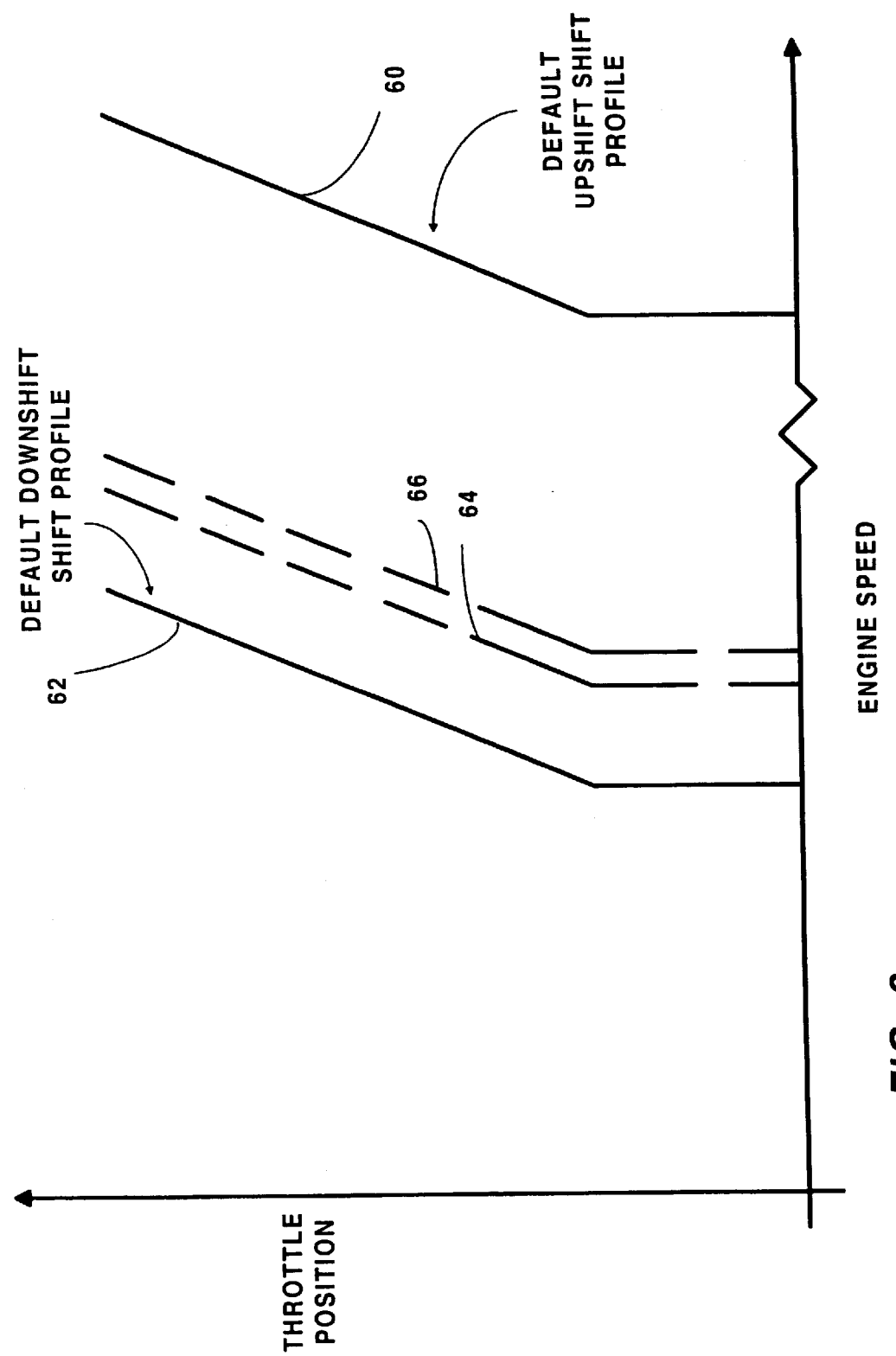
FIG. 2 is a schematic illustration, in graphical format, illustrating shift point profiles for the transmission system of FIG. 1 according to the present invention.

The downshift control of the present invention to provide enhanced vehicle retardation in response to sensed actuation of the engine brake and/or engine and foot brake systems may be seen by reference to FIG. 2. FIG. 2 is a graphical representation of shift point profiles utilized to determine when shift commands should be issued by the ECU 28 to the shift actuator 52. Solid line 60 is the default upshift profile, while solid line 62 is the default downshift profile. As is known, if the vehicle is operating to the right of upshift profile 60, an upshift of transmission 14 should be commanded, while if the vehicle is operating to the left of downshift profile 62, a downshift should be commanded. If the vehicle is operating in between profiles 60 and 62, no shifting of the transmission is then required. At or below a certain engine speed, ESD/S, a downshift will be commanded. As is discussed in detail in aforementioned U.S. Pat. No. 4,361,060, the shift profiles may be modified or moved in response to certain sensed vehicle operating conditions to provide enhanced drive line performance. To provide enhanced vehicle retardation, the downshift profile (i.e., the engine speed ESD/L at which downshifts are commanded) is moved, as will be discussed in detail below.

Upon sensing manual actuation of the engine brake 46, the system will react to force an early downshift by shifting the downshift profile rightwardly (i.e., increasing the engine speed at which a downshift will be commanded, thereby increasing the speed of the engine upon completion of a downshift). In the example illustrated in FIG. 2, if operation of the engine brake EB is set and/or operation of the engine brake and operation of the foot brake system is set, the downshift profile will be shifted rightwardly, as indicated by shift profile 66. Shift profile 66 will result in an earlier downshift and a relatively elevated engine speed at completion of the forced downshift. By way of example, at lower throttle position values, if the default downshift value is about 950 RPM, the forced downshift value of profile 66 will be about 1300–1400 RPM.

If engine braking but not foot braking is set, upon forcing a downshift, the control will command a downshift to bring engine speed to about 1400–1700 RPM; if engine braking and foot braking are set, the control will command a downshift to bring engine speed to between about 1700–2000 RPM. Operating at such elevated engine speeds will result in enhanced engine brake effectiveness in retarding the speed of the vehicle.

If engine braking but not foot braking is set and vehicle speed is above a given value (i.e., about 30 MPH), after a forced downshift (i.e., a downshift from profile 66), the downshift profile will return to the default value 62 thereof. If engine braking but not foot braking is set and vehicle speed is below the set value (i.e., OS<REF), then the downshift profile is caused to assume a profile value 64 intermediate default profile 62 and the forced downshift profile 66. By way of example, if at lower throttle positions the default profile 62 value is about 950 RPM and the forced downshift profile 66 value is about 1300–1400 RPM, then the value on profile 64 will be about 1100 RPM.

If engine braking and foot braking both are set, the forced downshift profile 66 will remain effective. If the engine brake is activated, the system raises the downshift point to approximately 1300–1400 RPM (the value is two ratio steps down from the maximum engine speed). The downshift made under these conditions, if any, brings the engine speed to between 1400–1700 RPM, allowing the driver a moderate level of engine braking.

If the engine brake is pressed and the foot/service brake is pressed, or if the two are pressed together, then the system will raise the downshift point to approximately 1300–1400 RPM. The system will make a downshift, if necessary, to bring the engine speed to between 1700–2000 RPM to give a maximum level of engine braking. As the vehicle slows down, it will downshift again when it reaches the raised dsownshift point (1300–1400 RPM) and make a skip downshift to bring the engine speed up to approximately 2000 RPM.

As long as the driver keeps his foot on the engine brake (he may release the foot brake if he wishes), the system will remain in this state. While in this mode, if the driver removes his foot from the foot brake, the system will remain in this mode. If the driver then reapplies the foot brake while maintaining the engine brake on, the system will make a downshift if possible (usually a single) to raise the engine speed as high as possible. This assists in maximizing engine brake performance when descending hills.

In summary, there are two enhanced braking states, engine-brake-only and engine-brake-plus-foot-brake. Engine-brake-only gives moderate engine speeds and a moderate level of engine braking (single shifts, skips at lower vehicle speeds). Engine-brake-plus-foot-brake gives higher engine speeds for a maximum level of engine braking (skip shifts, though the first shift may be a single to get it into the 1700–2000-RPM range, for example, 1800–1900 RPM). The driver may switch between the two states very easily, for example, touching the foot brake while in engine-brake-only mode changes to engine-brake-plus-foot-brake. Also, if the driver is in engine-brake-plus-foot-brake mode (foot off foot brake) and briefly releases the engine brake, he will revert to engine-brake-only mode.

Figure 3A:
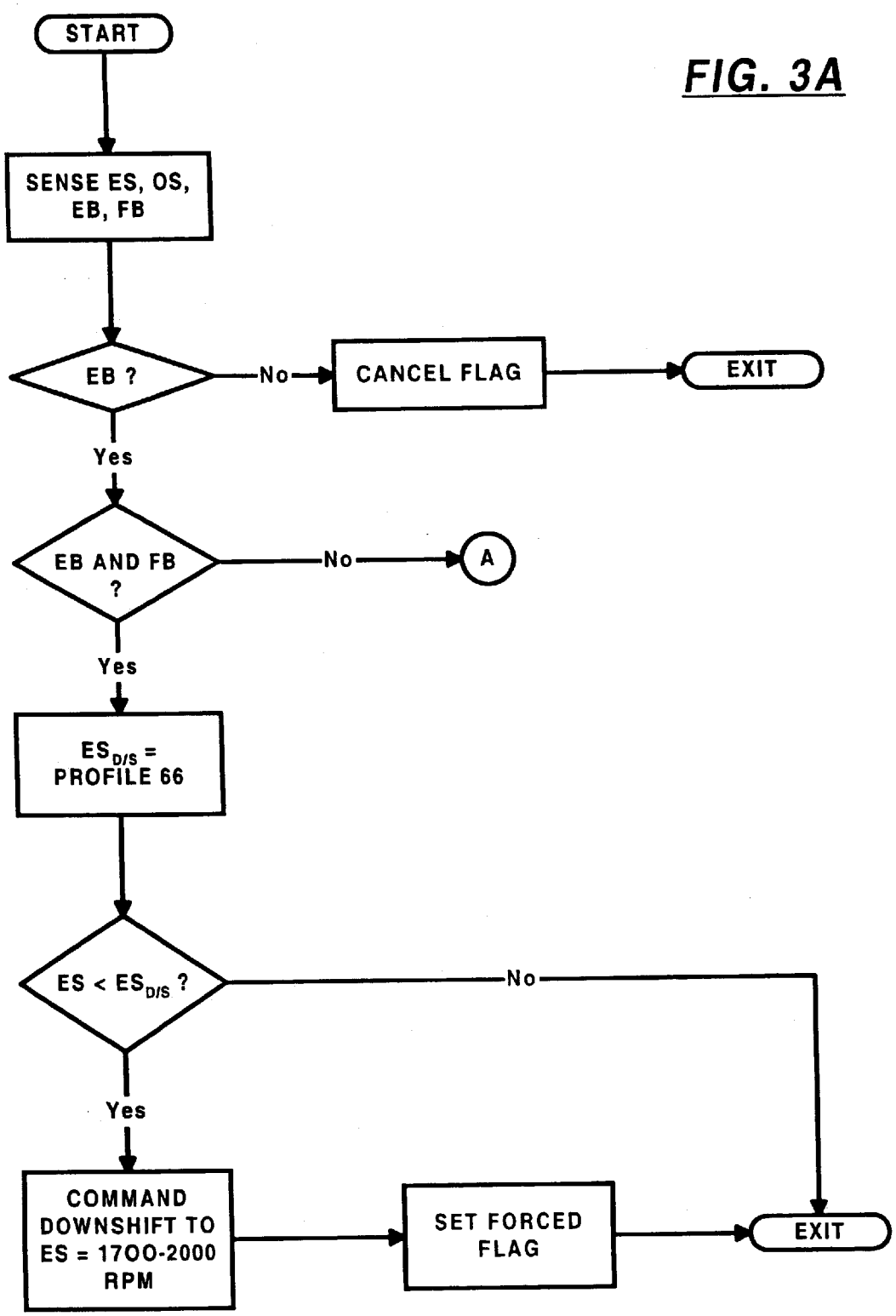
FIGS. 3A and 3B are schematic illustrations, in flow chart format, of the control of the present invention.
Figure 3B:
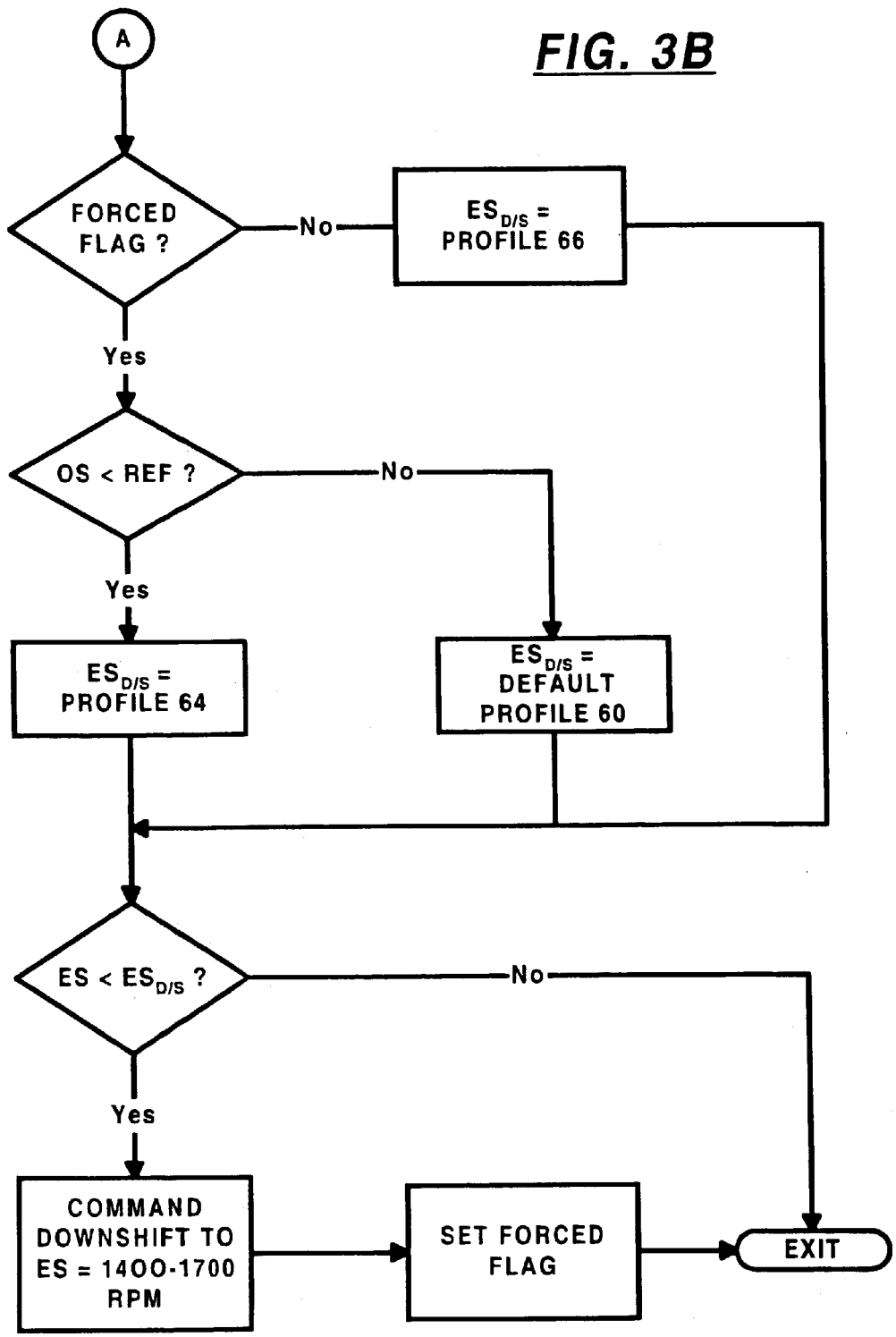

The control of the present invention is shown in flow chart format in FIGS. 3A and 3B.

Accordingly, it may be seen that an improved control system/method for an at least partially automated mechanical transmission system in a vehicle having manually operated engine brake and foot brake systems is provided. The system modifies the engine speeds at which downshifts are commanded and responds to sensing operation of the foot brake system and/or the engine brake system to enhance the vehicle retardation effectiveness of the engine brake system.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A method for controlling automatic downshifting in a vehicular automated mechanical transmission system (10) for a vehicle equipped with a manually operated foot brake system and a manually operated engine brake system, said automated mechanical transmission system comprising a fuel controlled engine (12), a multiple-speed mechanical transmission (14), and a controller (28) for receiving input signals (30) including one or more of signals indicative of engine speed (ES), foot brake system operation (FB), and engine brake system operation (EB), and to process said input signals in accordance with with logic rules to issue command output signals (32) to transmission system actuators including a transmission actuator (52) effective to shift said transmission, said method characterized by:

(i) establishing a default value (62) for engine speed at which a downshift will be commanded;

(ii) sensing for operation of said engine brake system (EB);

(iii) if engine brake system operation is sensed, then increasing the value of engine speed at which downshifts will be commanded ($ES_{D/S}$) to a first increased value (66) greater than said default value.

2. The method of claim 1 further characterized by sensing operation of said foot brake system (FB?) and, after a downshift from said first increased value, (iv) causing the engine speed at which downshifts will be commanded to remain at said first increased value if operation of both the engine brake system and foot brake system are sensed.

3. The method of claim 1 further characterized by sensing operation of said foot brake system (FB?) and, after a downshift from said first increased value, (v) causing the engine speed at which downshifts will be commanded to be decreased to a second increased value (64) if operation of the engine brake system but not the foot brake system is sensed and vehicle speed is less than a reference value (OS<REF), said second increased value (64) being greater than said default value but less than said first increased value (62<64<66).

4. The method of claim 2 further characterized by sensing operation of said foot brake system (FB?) and, after a downshift from said first increased value, (v) causing the engine speed at which downshifts will be commanded to be decreased to a second increased value (64) if operation of the engine brake system but not the foot brake system is sensed and vehicle speed is less than a reference value (OS<REF), said second increased value (64) being greater than said default value but less than said first increased value (62<64<66).

5. The method of claim 1 further characterized by sensing operation of said foot brake system (FB?) and, after a downshift from said first increased value, (vi) causing the engine speed at which downshifts will be commanded to return to said default value (62) if operation of the engine brake system but not the foot brake system is sensed and vehicle speed is greater than a reference value (OS>REF).

6. The method of claim 2 further characterized by sensing operation of said foot brake system (FB?) and, after a downshift from said first increased value, (vi) causing the engine speed at which downshifts will be commanded to return to said default value (62) if operation of the engine brake system but not the foot brake system is sensed and vehicle speed is greater than a reference value (OS>REF).

7. The method of claim 4 further characterized by sensing operation of said foot brake system (FB?) and, after a downshift from said first increased value, (vi) causing the engine speed at which downshifts will be commanded to return to said default value (62) if operation of the engine brake system but not the foot brake system is sensed and vehicle speed is greater than said reference value (OS>REF).

8. The method of claim 1 further characterized by sensing operation of said foot brake system (FB?), and downshifts from said first increased value are to a target gear ratio ($GR_T$) intended to result in a first target gear engine speed ($ES_{TG}$) if operation of both the engine brake system and foot brake system are sensed and in a second target gear ratio, engine speed less than said first target gear engine speed, if operation of the engine brake system but not the foot brake system is sensed.

9. The method of claim 2 further characterized by sensing operation of said foot brake system (FB?), and downshifts from said first increased value are to a target gear ratio ($GR_T$) intended to result in a first target gear engine speed ($ES_{TG}$) if operation of both the engine brake system and foot brake system are sensed and in a second target gear ratio engine speed less than said first target gear engine speed ($ES_{TG}1 > ES_{TG}2$), if operation of the engine brake system but not the foot brake system is sensed.

10. The method of claim 3 further characterized by sensing operation of said foot brake system (FB?), and downshifts from said first increased value are to a target gear ratio ($GR_T$) intended to result in a first target gear engine speed ($ES_{TG}$) if operation of both the engine brake system and foot brake system are sensed and in a second target gear ratio, engine speed less than said first target gear engine speed, if operation of the engine brake system but not the foot brake system is sensed.

11. The method of claim 4 further characterized by sensing operation of said foot brake system (FB?), and downshifts from said first increased value are to a target gear ratio ($GR_T$) intended to result in a first target gear engine speed ($ES_{TG}$) if operation of both the engine brake system and foot brake system are sensed and in a second target gear ratio, engine speed less than said first target gear engine speed, if operation of the engine brake system but not the foot brake system is sensed.

* * * * *